United States Patent [19]

Penkrot

[11] Patent Number: 4,606,880
[45] Date of Patent: Aug. 19, 1986

[54] SYMMETRIC BLANKET NUCLEAR FUEL ASSEMBLY

[75] Inventor: John A. Penkrot, Baldwin Borough, Pa.

[73] Assignee: Westinghouse Electric Corp., Pittsburgh, Pa.

[21] Appl. No.: 663,522

[22] Filed: Oct. 22, 1984

[51] Int. Cl.$^4$ ............................................... G21C 3/28
[52] U.S. Cl. ..................................... 376/173; 376/435; 376/449
[58] Field of Search ............................... 376/171–173, 376/435, 438, 428, 447, 449, 349

[56] References Cited

U.S. PATENT DOCUMENTS

| | | |
|---|---|---|
| 2,992,982 | 7/1961 | Avery . |
| 3,042,598 | 7/1962 | Crowther ............................. 376/447 |
| 3,049,487 | 8/1962 | Harrer et al. ........................ 376/447 |
| 3,158,543 | 11/1964 | Sherman et al. . |
| 3,211,621 | 10/1965 | Creagan . |
| 3,285,821 | 11/1966 | Brubaker ............................. 376/173 |
| 3,297,539 | 1/1967 | Beckurts et al. . |
| 3,314,859 | 4/1967 | Anthony .............................. 376/447 |
| 3,366,546 | 1/1968 | Anthony et al. ..................... 376/447 |
| 3,396,078 | 8/1968 | Visner ................................. 376/173 |
| 3,910,818 | 10/1975 | Sofer . |
| 4,059,484 | 11/1977 | Bupp et al. .......................... 376/435 |
| 4,096,033 | 6/1978 | Barry . |
| 4,235,669 | 11/1980 | Burgess et al. ...................... 376/173 |
| 4,251,321 | 2/1981 | Crowther ............................ 376/435 |
| 4,326,919 | 4/1982 | Hill . |
| 4,378,329 | 3/1983 | Uchikawa et al. . |
| 4,507,259 | 3/1985 | Cowell et al. ........................ 376/173 |

FOREIGN PATENT DOCUMENTS

| | | |
|---|---|---|
| 3247544 | 7/1983 | Fed. Rep. of Germany ...... 376/173 |
| 2552921 | 4/1985 | France . |
| 0061697 | 5/1977 | Japan .................................. 376/349 |
| 792113 | 3/1958 | United Kingdom ............... 376/172 |
| 915370 | 1/1963 | United Kingdom ............... 376/349 |
| 2147452 | 5/1985 | United Kingdom . |

Primary Examiner—Harvey E. Behrend

[57] ABSTRACT

A symmetric blanket fuel assembly forming a part of a radial blanket in a nuclear reactor core includes a first group of fuel rods which contain natural uranium and a second group of fuel rods which contain enriched uranium. The first group is surrounded by the second group in a symmetrical relationship in which the first group forms an inner, centrally-located, generally squared pattern having four sides and the second group forms an outer, peripherally-located generally squared annular pattern which surrounds the first group on all four sides thereof. Also, a plurality of guide thimbles are interspersed in spaced-apart relationship among both the first and second groups of fuel rods, preferably likewise in a squared pattern.

7 Claims, 3 Drawing Figures

LEGEND:
◉ NATURAL URANIUM FILLED FUEL RODS
⊗ ENRICHED URANIUM FILLED FUEL RODS

LEGEND:
⊙ NATURAL URANIUM FILLED FUEL RODS
⊗ ENRICHED URANIUM FILLED FUEL RODS

SYMMETRIC BLANKET NUCLEAR FUEL ASSEMBLY

BACKGROUND OF THE INVENTION

1. Field of the Invention

The present invention relates generally to nuclear reactors and, more particularly, is concerned with fuel assemblies in the nuclear reactor core which each has a symmetric blanket assembly design composed of a number of centrally-located natural uranium fuel rods surrounded symmetrically by a greater number of peripherally-located enriched uranium fuel rods.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the guide thimbles. Top and bottom nozzles on opposite ends of the assembly are secured to the guide thimbles, which extend slightly above and below the ends of the fuel rods, so as to form the fuel assembly as an integral unit.

Each of the fuel rods in the array thereof in the fuel assembly includes nuclear fuel pellets which are responsible for creating the reactive power of the reactor core. All of the fuel assemblies of the reactor core are substantially identical except for different percent enrichment of fuel material in the fuel rods of one group of assemblies compared to another group. Traditionally, the fuel rods in some of the fuel assemblies of the core contain enriched uranium, generally known as fissile material, which is capable of sustaining a chain reaction, whereas the fuel rods in other of the fuel assemblies contain natural uranium, generally known as fertile material, which is incapable of sustaining a chain reaction, but which later converts to fissionable material upon exposure to neutron bombardment. It is conventionally well-known that natural uranium refers to uranium found in nature which consists of 99.3% U-238, 0.7% of U-235 and minute traces of U-234, whereas enriched uranium refers to uranium in which the percentage of the fissionable isotope U-235 has been increased above the 0.7% contained in natural uranium.

Basically, fuel assemblies containing enriched uranium are known as seed assemblies, while those containing natural uranium as known as blanket assemblies. Various reactor core loading arrangements of seed and blanket assemblies are known in the art. Several of such arrangements are described and depicted in U.S. Patents to Sherman et al U.S. Pat. No. (3,158,543), Creagan U.S. Pat. No. (3,211,621), Barry U.S. Pat. No. (4,096,033), Hill U.S. Pat. No. (4,326,919) and Uchikawa et al U.S. Pat. No. (4,378,329).

Many arrangements in use at the present time incorporate what is known as a radial blanket concept. This design concept positions fuel assemblies containing natural uranium, i.e. the blanket assemblies, directly on the core periphery, next to the core baffle, to improve fertile material conversion and decrease neutron leakage. However, such positional relationship of the blanket assemblies relative to the center and periphery of the core has two major drawbacks both of which are related to the asymmetric loading of natural uranium entailed in such arrangement. First, the enriched uranium of the seed assemblies, located next to the natural uranium of the blanket assemblies, is under-utilized and thus achieves lower than average burnup rates. Second, serious peaking problems can occur when these assemblies are shuffled to other locations in the core in which natural uranium is not along a core boundary.

Consequently, a need exists for improvement of the arrangement of natural and enriched uranium materials within the core of a reactor in a manner which increases the efficiency of the nuclear fuel while keeping potential leakage and peaking problems under control.

SUMMARY OF THE INVENTION

The present invention provides a symmetric blanket assembly designed to satisfy the aforementioned needs. The design of the present invention provides both natural and enriched uranium in each of the fuel assemblies located on the core periphery and places the natural uranium within the assembly in a symmetrical relationship with the enriched uranium. In other words, the natural uranium is located at the center of the assembly, while the enriched uranium is located on all sides thereof. This design maintains control of leakage and peaking, while providing other identifiable advantages not present in prior designs. First, unlike the prior assembly designs with only natural uranium on the core baffle, the symmetric blanket assembly may be shuffled from one core face to another and from a corner location to one along the flats without any deleterious effects, and may even be shuffled inboard with smaller impact on peaking. Second, shuffling the symmetric blanket assembly from one core face to another allows the uranium to be burned more evenly, allowing the blanket assembly to be resident in the core for more cycles. Third, placing the fuel rods containing natural uranium in the water-rich center of the symmetric assembly allows the natural uranium to achieve higher burnup rates. Also, plutonium conversion is likely to be improved. Finally, prior designs with natural uranium along the core baffle require two designs: one with natural uranium along one face and the other with natural uranium along two adjacent faces. Thus, these designs must be manufactured with four different configurations of natural uranium, including 90, 180 and 270 degree rotations of the basic design. In contrast thereto, the symmetric blanket assembly requires only a single design, with no variations.

Accordingly, the present invention sets forth for use in a radial blanket in a nuclear reactor core, a symmetric blanket fuel assembly comprising: (a) a first group of spaced-apart fuel rods containing fertile material, such as natural uranium; and (b) a second group of spaced-apart fuel rods containing fissile material, such as enriched uranium. The fuel rods of the first group are surrounded by the fuel rods of the second group in a predetermined symmetrical relationship. More particularly, in the preferred form of the symmetrical relationship, the first and second groups of fuel rods together compose a squared array of fuel rods in which the first group forms an inner, centrally-located, generally squared pattern having four sides and the second group forms an outer, peripherally-located, generally squared, annular pattern which surrounds the first group on all four sides thereof. Further, the fuel rods of each group are aligned with one another in columns and rows. Also, a plurality of guide thimbles are disposed in spaced-apart relationships among both the first and second groups of fuel rods, preferably in a generally squared pattern of aligned columns and rows.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
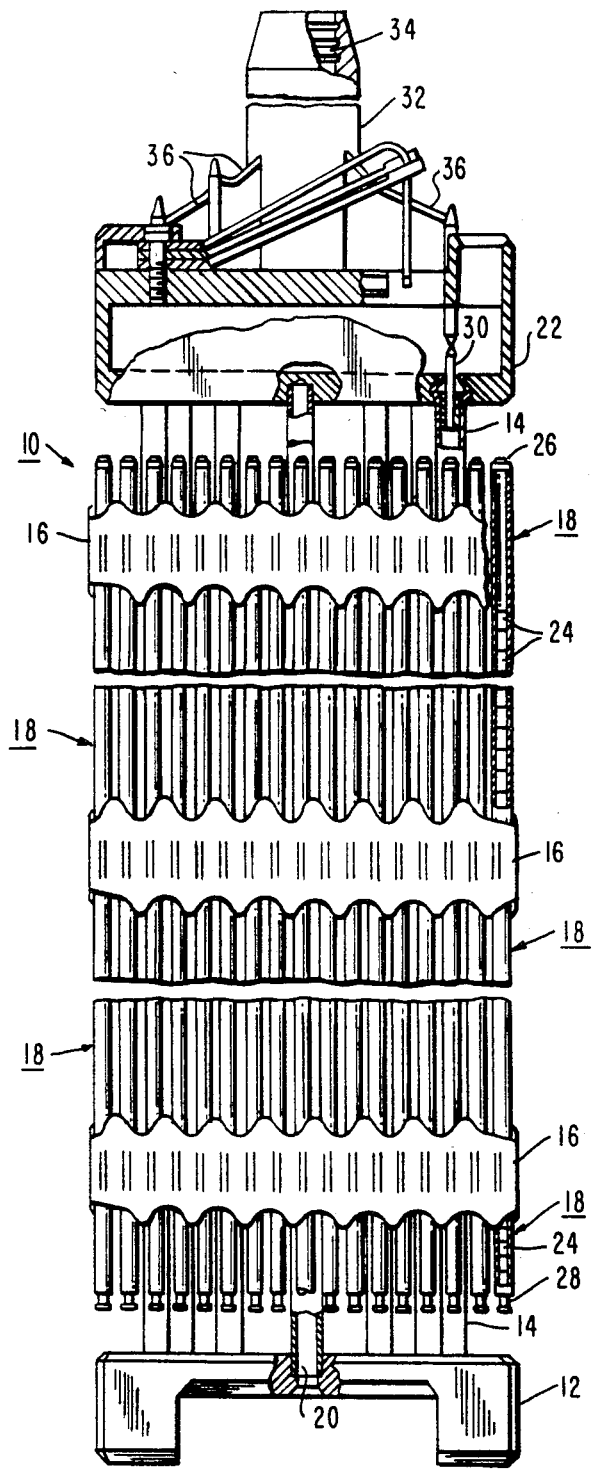
FIG. 1 is an elevational view, partly in section, of a fuel assembly constructed in accordance with the present invention, the assembly being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rods are closed by upper and lower end plugs 26,28.

In accordance with the present invention to be described below, the fuel pellets 24 of some of the fuel rods 18 are composed of fertile material, while the pellets 24 of other of the fuel rods 18 are composed of fissile material. This is the only difference between the fuel rods 18. The fissile material is responsible for creating the reactive power of the PWR and for causing conversion of the fertile material into fissile material as operation of the reactor proceeds. A liquid moderator/coolant, such as water, or water containing boron, is pumped upwardly through the fuel assemblies of the core in order to extract heat generated therein for the production of useful work.

To control the fission process, a number of control rods 30 are reciprocally movable in the guide thimbles 14 located at predetermined positions in the fuel assembly 10. Specifically, the top nozzle 22 includes a rod cluster control mechanism 32 having an internally threaded cylindrical member 34 with a plurality of radially extending flukes or arms 36. Each arm 36 is interconnected to a control rod 30 such that the control mechanism 32 is operable to move the control rods 30 vertically in the guide thimbles 14 to thereby control the fission process in the fuel assembly 10, all in a well-known manner.

Symmetric Blanket Nuclear Fuel Assembly

As mentioned briefly above, the fuel assembly 10 contains both natural uranium and enriched uranium materials. These materials are provided separately in stacked pellet form in individual ones of the fuel rods 18. Furthermore, the respective fuel rods 18 containing the different materials are arrayed together in a predetermined relationship which enhances the fission process and thereby the burnup rates of the nuclear fuel material.

Figure 2:
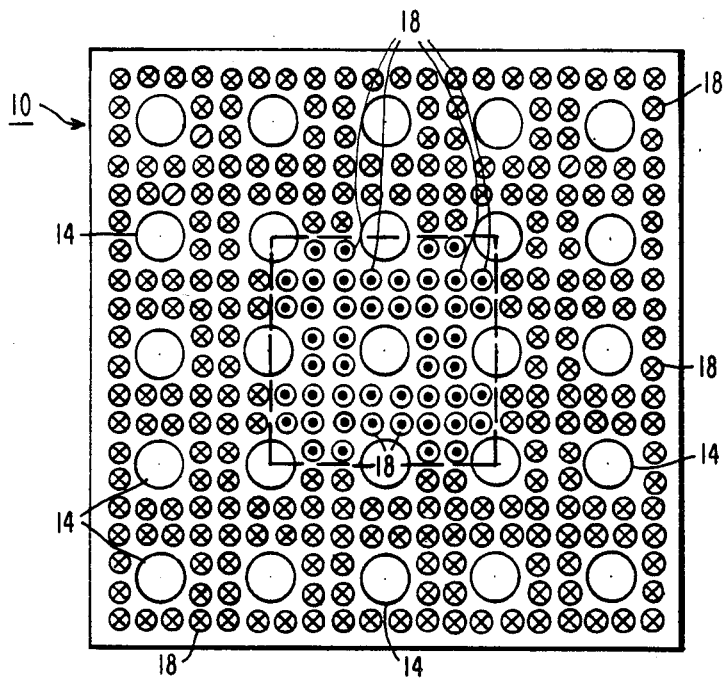
FIG. 2 is an enlarged cross-sectional diagram of the fuel assembly of FIG. 1, showing the patterns of fertile fuel rods, fissile fuel rods and guide thimbles composing the blanket fuel assembly and the symmetrical relationship between them.

More particularly, as seen in FIG. 2, the ones of the fuel rods 18 containing the fertile material, i.e. the natural uranium, and forming a first group are designated by a central "." dot, while the others of the fuel rods 18 containing the fissile material, i.e. the enriched uranium, and forming a second group are designated by a "x". As is readily apparent, the first group of spaced-apart natural uranium filled fuel rods are surrounded by the second group of spaced-apart enriched uranium filled fuel rods in a predetermined symmetrical relationship.

In the preferred form of the symmetrical relationship, the first and second groups of fuel rods 18 compose an overall squared array of fuel rods. In the overall array, fuel rods in the first group form an inner, centrally-located, generally squared pattern having four sides, as represented by the connected dashed lines in FIG. 2, whereas fuel rods in the second group form an outer, peripherally-located, generally squared annular pattern which surrounds the first group on all four sides thereof. Further, the fuel rods 18 of each group are aligned with one another in columns and rows.

Also, a plurality of guide thimbles 14 are interspersed in spaced-apart relationship among both the first and second groups of fuel rods 18. The guide thimbles 14, preferably, define a generally squared pattern in which the thimbles are aligned in columns and rows.

Figure 3:
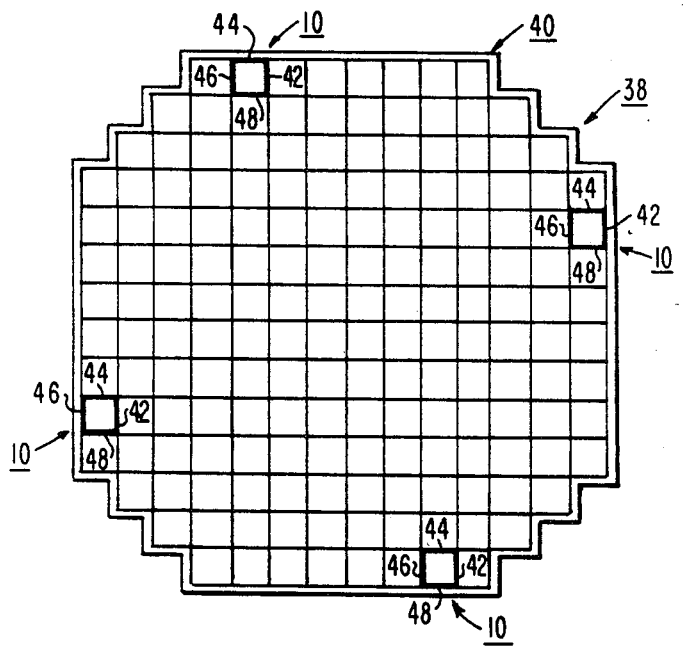
FIG. 3 is a cross-sectional diagram of a nuclear reactor core in which the symmetric blanket fuel assembly of the present invention is utilized, showing an example of the possible positions of the assembly in successive cycles of the core.

Because of the symmetrical relationship of the first and second groups of fuel rods 18, the assembly 10 need not remain in one location while resident in the core. As depicted in FIG. 3, at each cycle of operation of the reactor core 38, a given one of the fuel assemblies 10 can be shuffled about the core baffle 40 such that a different one of the four sides 42,44,46,48 of the assembly 10 is facing toward the core baffle 40 at each position. By shuffling from one core face to the other from cycle to cycle, the uranium burns more evenly, improving fuel utilization. Also, the placement of the natural uranium filled fuel rods in the water-rich assembly center allows greatly increased burnup and possibly improved plutonium production from the fertile material.

It is thought that the symmetric blanket fuel assembly of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having a plurality of spaced-apart fuel rods, the combination comprising:
   (a) a first group of said fuel rods containing natural uranium only; and
   (b) a second group of said fuel rods constituting the remainder thereof containing enriched uranium only;
   (c) said fuel rods of said first group being surrounded by said fuel rods of said second group in a predetermined symmetrical relationship;
   (d) said first group of said fuel rods forming an inner, centrally-located, generally squared pattern wherein the only fuel rods present in said inner squared pattern are said fuel rods of said first group;
   (e) said second group of said fuel rods forming an outer, peripherally-located, generally squared annular pattern which surrounds said first group wherein the only fuel rods present in said outer squared pattern are said fuel rods of said second group.

2. The fuel assembly as recited in claim 1, wherein said first and second groups of fuel rods together compose a squared array in which said fuel rods of each group are aligned with one another in columns and rows.

3. The fuel assembly as recited in claim 1, wherein said patterns of said first and second groups of fuel rods together compose a squared array of fuel rods.

4. The fuel assembly as recited in claim 1, wherein:
said squared pattern of said first group has four sides; and
said squared annular pattern of said second group surrounds said first group on all four sides thereof.

5. The fuel assembly as recited in claim 1, further comprising:
a plurality of guide thimbles disposed in spaced-apart relationship among both said first and second groups of said fuel rods.

6. The fuel assembly as recited in claim 5, wherein said guide thimbles are formed in a generally squared pattern of aligned columns and rows of said thimbles.

7. In a fuel assembly for use in a radial blanket in a nuclear reactor core, said fuel assembly having a plurality of spaced-apart fuel rods, the combination comprising:
   (a) a first group of said fuel rods containing natural uranium only;
   (b) a second group of said fuel rods constituting the remainder thereof containing enriched uranium only;
   (c) said fuel rods of said first group being surrounded by said fuel rods of said second group in a predetermined symmetrical relationship wherein said first and second groups together compose a squared array of fuel rods;
   (d) said first group of fuel rods in said squared array forming an inner, centrally-located, generally squared pattern wherein the only fuel rods present in said inner squared pattern are said fuel rods of said first group;
   (e) said second group of fuel rods in said squared array forming an outer, peripherally-located, generally squared annular pattern which surrounds said first group wherein the only fuel rods present in said outer squared pattern are said fuel rods of said second group;
   (f) said rods of each group being aligned with one another in columns and rows; and
   (g) a plurality of guide thimbles interspersed in spaced-apart relationship among both said first and second groups of fuel rods in a generally squared pattern;
   (h) said guide thimbles in said squared pattern thereof being aligned in columns and rows.

* * * * *